Patented Feb. 28, 1939

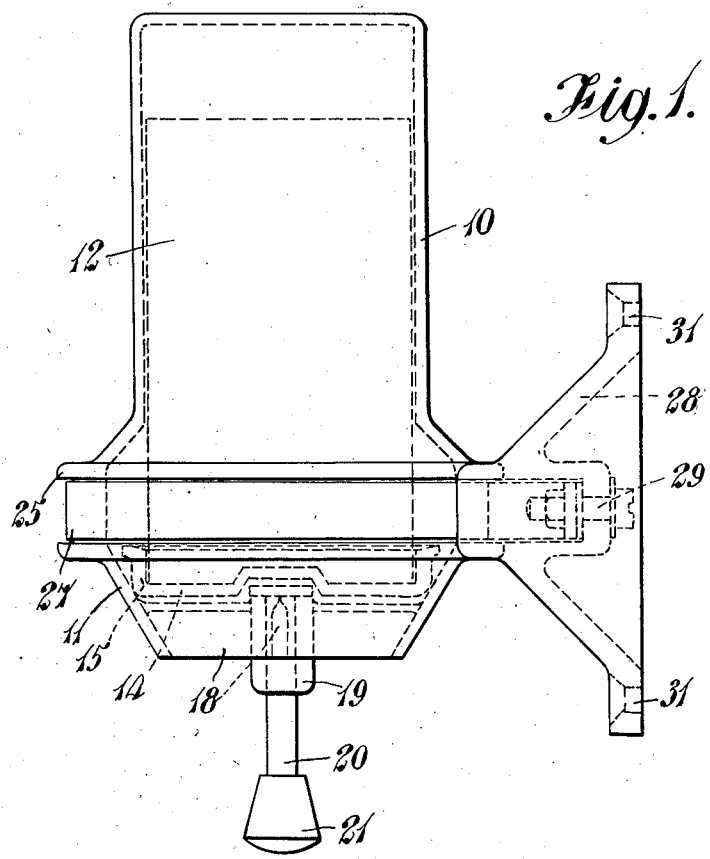
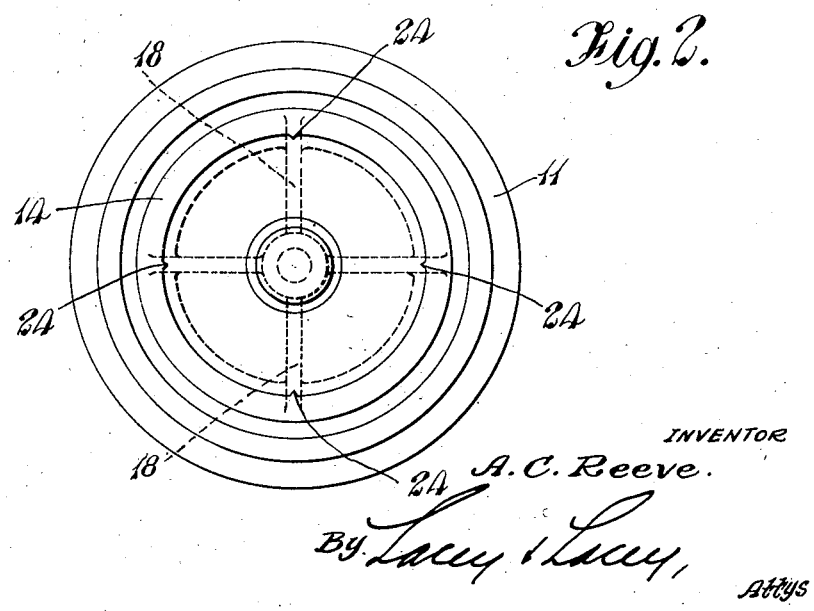

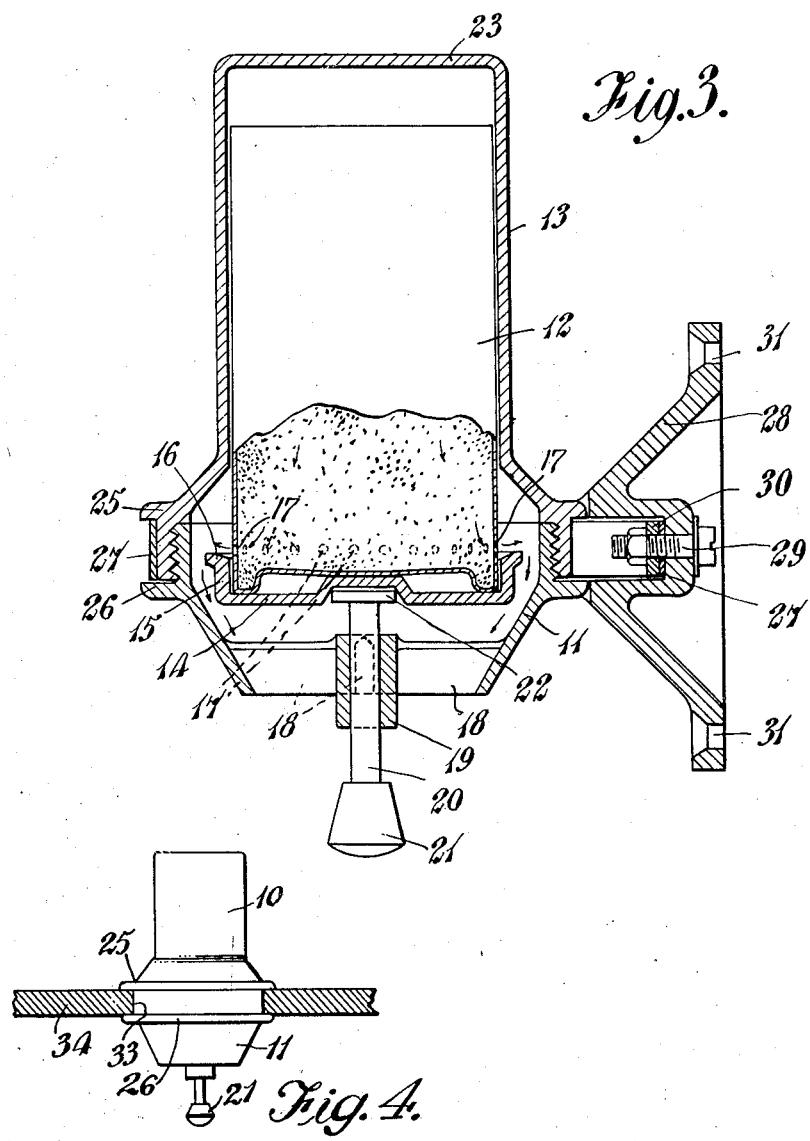

2,148,711

UNITED STATES PATENT OFFICE 2,148,711

CONTAINER AND DISPENSING DEVICE FOR POWDERED SOAPS AND THE LIKE

Archie Campbell Reeve, Hounslow, England

Application March 22, 1938, Serial No. 197,465
In Great Britain March 22, 1937

8 Claims. (Cl. 221—61)

This invention relates to containers and dispensing devices for powdered soap and the like, and it has for its main object to provide improvements in the known form of powder container comprising a cylindrical outer casing and an inner powder receptacle, which latter is also of cylindrical form, and is fitted so as to be axially slidable within the outer casing.

It is a further object of the invention to provide a combined soap container and dispensing device which is particularly robust and is moreover pleasing in appearance, the arrangement being such that when the device is not actually delivering the powdered soap or equivalent it is automatically closed, thus preventing the ingress of steam and damp air.

The invention accordingly provides a container and dispensing device for powdered soap comprising an outer cylindrical casing closed at its upper end and open at its bottom, and slidably mounted therewithin a cylindrical powder container which is open at its upper end and is formed around the periphery of its base with a plurality of discharge openings, means being fitted for reciprocating the inner container within the outer casing, and the invention being characterized by the fact that there is provided upon the bottom of the inner container a cap which coengages with the bottom part of the casing so as to close the latter completely when the device is inoperative. Preferably, the interior of the outer casing at the bottom thereof is frusto-conical in shape and forms a completely circular seating for the cap, said outer casing conveniently being made in two portions connected by a screw-threaded or equivalent joint, thus allowing the inner container to be removed. Moreover, the cap may advantageously be formed upon its interior with a series of projecting ribs adapted to press into the material of which the inner container is composed, said cap conveniently being formed with an outwardly directed shelf upon which the powder delivered through the discharge openings falls and from which it is dislodged by the downward current of air passing from the small space existing between the inner container and the outer casing.

The present invention is an improvement of the powdered soap dispensing device described and claimed in my patent specification No. 2,076,323, dated April 6, 1937.

One form of container and dispensing device which has been specially designed for facilitating the use of powdered soap is illustrated in the accompanying drawings in which:

Figure 1 is a side elevation, the inner container and cap being indicated in their inoperative positions;

Figure 2 is a plan showing the bottom part of the outer casing and the cap disposed therein;

Figure 3 is a sectional view corresponding to Figure 1 and illustrating the action of the device.

Figure 4 is a side elevation, drawn to a reduced scale, showing a modified method of mounting the device.

In the preferred construction of device as shown in the drawings the various parts are manufactured from moulded plastic material, such as synthetic resin, as this produces a relatively robust article which is easy to keep clean and is quite free from corrosion. It will be understood, however, that any other suitable material may be employed without departing from the invention.

The device comprises an outer casing which is mainly cylindrical in shape, and is composed of an upper part 10 and a lower portion 11 screw-threaded together in a manner shown in Figure 3. An inner container 12, which can conveniently be of a relatively temporary nature so as to be renewed each time a fresh supply of powder is inserted into the device, is also of cylindrical form and is arranged to fit slidably within the upper part 10 of the outer casing, a slight clearance indicated at 13 being present. The upper end of the inner container is open, while its lower part is arranged to fit snugly within a cap member 14 having an upwardly extending flange 15 and an outward shelf 16. Immediately above the latter the inner container 12 is formed around its periphery with a series of holes 17 through which the powdered soap from the interior of the container 12 is discharged as will be hereinafter explained.

The lower part 11 of the outer casing is frusto-conical in form and has a series of inwardly extending arms 18 supporting a central bush 19 within which a push rod 20 is slidably mounted. The lower end of the push rod is provided with a knob 21, while its upper end has a head 22 by which it is held in position and which bears against the bottom of the cap 14. The upper edges of the arms 18 are pointed as shown in Figure 3 so as to prevent the powder from lodging thereon.

It will be seen from Figure 1 that when the device is inoperative the cap 14 engages around the whole of its periphery with the interior of the frusto-conical portion 11, so that the interior of the outer casing is satisfactorily sealed against the ingress of moisture, which would, of course, cause the powdered soap to become lumpy and thus affect the working of the device.

When the usual small quantity of powdered soap is required the knob 21 is pressed upwardly by the user, and as the top portion 10 of the outer casing is closed at 23 the air entrapped within said casing forces its way partly through the powder within the container 12, thus forcing some of said powder through the openings 17, and partly through the annular clearance space 13. This latter part of the air impinges upon the shelf 16 and blows the powdered soap lodging thereon outwardly and downwardly through the funnel-shaped lower portion 11 of the outer casing, and thus into the hand of the user.

The inner container 12 which can conveniently be formed from relatively cheap material, such as cardboard, can be used for holding the powdered soap when the latter is sold, a suitable lid (not shown) being, of course, provided. When a new supply of powder is required the lid is discarded, the holes 17 are opened or produced, and the container after being fitted into the cap 14 is gently pushed upwards into the outer casing 10, the lower portion 11 having previously been removed. In order that the inner container 12 may tightly fit within the cap 14, the flange 15 is formed with a plurality of sharp inwardly directed ribs which are indicated at 24 in Figure 2.

In order to provide convenient means for supporting the device the upper and lower parts 10 and 11 of the outer casing are formed with flanges 25 and 26 respectively, and as shown in Figures 1 and 3 these coact with a surrounding metal band 27 which is clamped to a moulded attachment member 28 by means of a bolt and nut 29 and a U-shaped stay member 30, thus constituting a neat and robust bracket assembly which can readily be secured to a wall or other suitable support by means of screws or equivalent passed through holes 31.

The improved design of outer casing is also suitable for mounting in other ways. Thus, in Figure 4, for example, a hole 33 of suitable diameter to accommodate the portion between the flanges 25 and 26 can be cut in an existing shelf, indicated at 34, and the parts 10 and 11 placed above and below said shelf before being screwed together so that said shelf 34 is gripped by the flanges 25 and 26.

The invention thus provides a simple and convenient form of dispensing device for powdered soap which has been found to be very satisfactory in practice. The cap upon the bottom of the inner container not only acts as an efficient valve to protect the soap from damp air but also adds weight to the bottom of the inner container, thus ensuring that the latter will fall smartly when the knob 21 is released.

What I claim is:

1. A container and dispensing device for powdered soap comprising an outer cylindrical casing closed at its upper end and open at its bottom, a cylindrical powder container slidably mounted therewithin, which container is open at its upper end and is formed around the peripery of its base with a plurality of discharge openings, means for reciprocating the inner container within the outer casing, and a cap which is provided upon the bottom of the inner container, and which co-engages with the bottom part of the casing so as to close the latter completely when the device is inoperative.

2. A device as claimed in claim 1, wherein the interior of the outer casing at the bottom is frusto-conical in shape and forms a completely circular seating for the cap.

3. A container and dispensing device for powdered soap comprising an outer cylindrical casing closed at its upper end and open at its bottom, and a cylindrical powder container slidably mounted therewithin, which container is open at its upper end and is formed around the periphery of its base with a plurality of discharge openings, means for reciprocating the inner container within the outer casing, and a cap which is provided upon the bottom of the inner container, and which co-engages with the bottom part of the casing so as to close the latter completely when the device is inoperative, the outer casing being formed in two portions connected by a screw-threaded or equivalent joint, thus allowing the inner container to be removed.

4. A device as claimed in claim 3, wherein each portion of the outer casing is formed with a peripheral flange and these flanges are arranged to grip a fixing bracket.

5. A device as claimed in claim 1, wherein the cap is formed with an upwardly directed marginal flange within which the inner container fits tightly.

6. A device as claimed in claim 1, wherein the cap is formed with an upwardly directed marginal flange within which the inner container fits tightly, the flange of the cap having upon its interior a series of projecting ribs adapted to press into the material of which the container is composed.

7. A device as claimed in claim 1, wherein the cap is formed with an outwardly directed shelf upon which the powder delivered through the discharge openings falls, and from which it is dislodged by the downward current of air passing from the small space between the inner container and the outer casing.

8. A device as claimed in claim 1, wherein the lower end of the outer casing is fitted with an axially extending tubular bush through which extends a push rod earing at its upper end upon the under surface of the cap, wherey a vertical reciprocating movement is imparted to the inner container.

ARCHIE CAMPBELL REEVE.